J. R. RICKETTS.
TROLLEY RETRIEVER.
APPLICATION FILED OCT. 16, 1911.
1,041,349.
Patented Oct. 15, 1912.
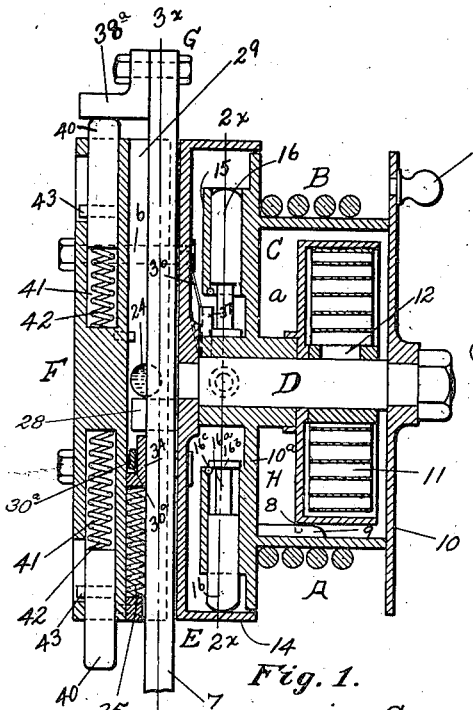
Fig. 1.
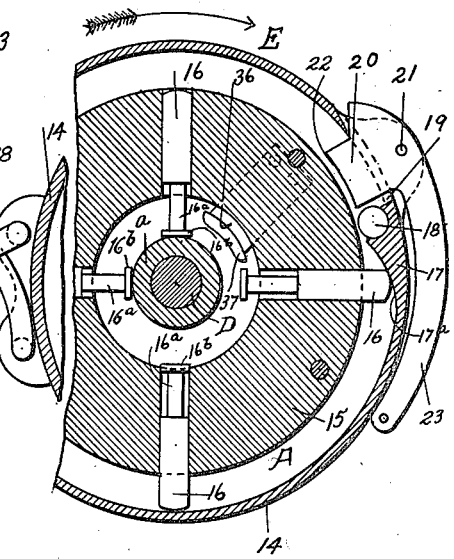
Fig. 2.
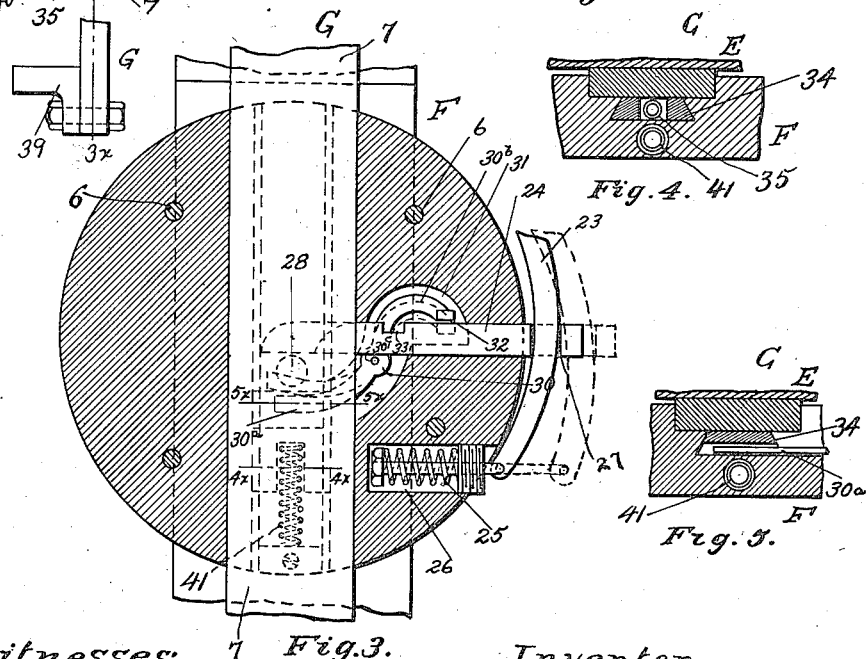
Witnesses:
H. Gearing
W. F. Seemans
Inventor,
James R. Ricketts,
By his Attorney

UNITED STATES PATENT OFFICE.

JAMES R. RICKETTS, OF LOS ANGELES, CALIFORNIA, ASSIGNOR TO THE LOS ANGELES TROLLEY CATCHER COMPANY, OF LOS ANGELES, CALIFORNIA, A CORPORATION OF CALIFORNIA.

TROLLEY-RETRIEVER.

1,041,349.  Specification of Letters Patent.  Patented Oct. 15, 1912.

Application filed October 16, 1911. Serial No. 654,806.

*To all whom it may concern:*

Be it known that I, JAMES R. RICKETTS, a citizen of the United States, residing at Los Angeles, in the county of Los Angeles and State of California, have invented certain new and useful Improvements in Trolley-Retrievers, of which the following is a specification.

This invention relates to trolley retrievers, and with respect to certain features thereof it concerns the invention covered by my prior U. S. patent for trolley catchers No. 974,920, dated November 8, 1910. In accordance with the invention covered by said prior patent, the present invention comprises in its reduction to practice a reel upon which the trolley cord is wound, a plurality of dogs slidable substantially radially of the reel, each dog adapted to drop by gravity as it passes through the upper portion of its path, a stationary abutment adapted to be engaged by the dog when the reel moves faster than the dog can drop by gravity, and means for preventing retraction of the dog after it has been engaged with the abutment, until the cord begins to partially rewind upon the reel in withdrawing the trolley or by the descent or the lowering of the trolley. In accordance with the present invention, I mount the reel slidably upon a track or way so that it can move vertically of the car, and provide a lock normally holding the reel in elevated position upon the way by contact with a stop on the way. The abutment is provided with trip-means for withdrawing the lock from the stop and allowing the descent of the reel by gravity to forcibly pull down the trolley after its disengagement with the trolley wire. I further provide a latch for holding the lock in retracted position until the ascent of the reel is caused, whereupon the stop actuates the latch to free the lock. The lock is normally held in working position by a spring acting upon the trip-means, and a spring normally urges the latch into engagement with the lock. When a dog engages the abutment the trip means are actuated to throw the lock and permit its engagement with the latch to hold the lock retracted and permit the reel to drop. When the latch strikes the stop on ascent of the reel, the lock is released, and the spring acting upon the trip-means forces the abutment into normal position. As the reel is elevated upon the way, the trolley is restored to the trolley wire, and all the parts assume normal working positions.

In the drawings, Figure 1 is a radial sectional view of a trolley retriever organized in accordance with the invention, parts being shown in elevation; Fig. 2 is a sectional view of the same, fragmentary, taken upon the line $2^x$—$2^x$, Fig. 1, the direction of rotation of the reel when the trolley jumps the wire being indicated by an arrow. Fig. 3 is a further sectional view of the same, taken upon the line $3^x$—$3^x$, Fig. 1; Fig. 4 is a fragmentary detail sectional view of the same, taken upon the line $4^x$—$4^x$, Fig. 3; and Fig. 5 is a further detail fragmentary sectional view of the same, partly in plan, taken upon the line $5^x$—$5^x$, Fig. 3.

Corresponding parts in all the figures are denoted by the same reference characters.

Referring with particularity to the drawing, A designates a reel upon which the trolley cord B is wound, the reel having a hub $a$ upon which is rigidly mounted a casing C, the hub rotating upon a spindle D, the inner end of which is fixed in a shell E. A supplemental shell or casing F is bolted to the rear or inner face of the shell E as at 6, there being a space between the casing E and the shell F to accommodate the track or way G, consisting of a flat bar 7 fixed to the end of the trolley car. A spring drum H is mounted upon the shaft D, being locked against continuous rotation in one direction by a finger 8 bearing upon a stop 9 upon the periphery of the reel A. The coil spring 11 of the spring drum, fast thereto at one end and at the other end to the shaft D, as at 12, may be put under tension by rotating the reel by a knob 13 fixed to the outer plate 10 of the reel. The shell E is cup-shaped, having an annular flange 14 concentric with the shaft D; and upon the inner wall $10^a$ of the reel A, at the rear face thereof, is mounted an annular housing 15 in which are mounted a plurality of radial slidable dogs 16, preferably four in number, each of which is provided at its inner end portion with a contracted stem $16^a$ terminating in a head $16^b$, there being a stop $16^c$ at the inner periphery of the housing 15 which limits the dogs in their play to the distance between the body of each dog and its head 16$^b$. The flange 14 of the shell E is provided upon its inner surface with a tapering lug 17, increasing in width inwardly toward the outer periphery of the housing 15, and having a curved inner face 17$^a$, and provided at its inner end with a rounded nose preferably consisting of a roller 18, but slightly spaced from the housing 15. The flange 14 is cut away directly adjacent to the large end of the lug 17, as at 19, and an abutment 20 is pivoted upon the flange 14, as at 21, to project within the opening 19, the inner face of the abutment being curved similarly with the periphery of the housing 15, as at 22, and normally but slightly spaced therefrom. The abutment carries a curved finger 23 constituting a trip for a lock 24 slidably mounted preferably substantially radially of the casing F, said finger being normally retracted at its outer end against the flange 14 by an expansive coil spring 25 applied to the outer end thereof and seated in a chamber 26 in the casing F. The lock or bolt 24 is provided exteriorly of the casing F with a bend 27 loosely receiving the finger 23, and normally rests upon a stop 28 fixed to one face of the track or way G, within the space between the shell E and the casing F which accommodates the track or way G, the casing F being preferably vertically chambered, as at 29, to accommodate the track or way, the outer end of the lock 24 and the stop 28, and one end 30$^a$ of a centrally pivoted latch 30, pivoted as at 30$^c$ to the casing F and mounted in a suitable chamber 31 in the casing F, and provided at its other end 30$^b$ with a lateral nose 32 normally resting upon the lock 24 and adapted to enter a notch 33 in the inner end of said lock, the said lock passing through the chamber 31. In the chamber 29 is also accommodated a radially slidable plunger 34 normally forced inwardly by a coil spring 35 in said casing, and bearing upon the inner end 30$^a$ of the latch 30, which inner end ranges beneath the stop 28.

Secured to the shell E by a bracket 36 is a segmental guide 37 spaced slightly from and within the housing 15, sufficiently to permit the heads 16$^b$ of the dogs 16 to pass between such guide and the housing when any such dog is in projected position.

38 designates a cord guide upon the flange 14 directing the cord B as it is wound and unwound.

The upper end of the way G is provided with a stop 38$^a$, and a stop 39 may be mounted upon the track or way at the lower end of the same, to limit the travel of the reel and its adjuncts, radial buffers 40 being mounted in the casing F, in suitable chambers 41 therein, for co-action with the said stops, said buffers being normally forced outwardly by coil springs 42 in said chambers and having stop pins 43 limiting their outward and inward movements.

The operation, method of use and advantages of the improvements in trolley retrievers constituting the invention will be readily understood from the foregoing description, taken in connection with the accompanying drawing and the following statement: With the reel and the shell E and casing F assembled as shown in Fig. 1, and slidably mounted upon the track or way G, and the cord B partially wound upon the reel A, the trolley pole is brought into contact with the line wire in the usual manner, with the reel in elevated position and the rounded outer end of the lock or bolt 24 resting upon the stop 28 upon the track or way. The parts are now in the positions shown in the drawing, the nose 32 of the latch 30 resting upon the lock 24. As the trolley pole rises and falls gradually in the usual manner, the dogs 16 which drop by gravity in the lower course of their circular path of travel, with the reel, freely pass the abutment 20. If the trolley escapes from the wire it is thrown violently upwardly, and rapidly rotates the reel A in the direction indicated by the arrow on Fig. 2. One of the dogs 16, initially projected by gravity, is then centrifugally projected and caused to strike the abutment 20, riding over the guide 37, and throwing the finger 23 outwardly, retracting the lock 24 from the stop 28, and permitting the reel and its adjuncts to fall upon the way G under gravity of the entire device, with the trolley. As the lock is retracted, the nose 32 of the latch 30 enters the notch 33 in the lock and holds it in projected position. The trolley rises and strikes the first cross-wire of the overhead construction, and as it rebounds from its contact with the said cross wire the reel A winds up the cord. If the trolley starts to rise again the same operation takes place as before, one of the dogs riding on to the guide 37 and coming against the abutment 20, preventing further unwinding or rising of the trolley. In the winding operation, the reel turns in the opposite direction, the dogs freely passing the lug 17 and the abutment 20. When the casing is raised and the trolley restored to the wire, the rounded end of the lock 24 passes the stop 28, and the inner end 30$^a$ of the latch strikes the stop 28, yielding against the spring 35 so that the nose 32 leaves the notch 33, and frees the lock 24 for its inward projection into position to rest upon the stop 28, the arm 23 being drawn inward by the spring 25.

Thus it will be seen, that the reel serves to wind up the cord upon the rebound of the freed trolley after striking the first cross wire of the overhead construction, and the descending reel with its adjuncts, when released from the stop 28, pulls the whole trolley way down out of any possibility of further engagement with and damage of the trolley or the overhead construction. It is intended that the trolley shall strike the first cross wire of the overhead construction as soon as it jumps the feed wire, although this striking of the cross wire is done at such an inclination that no damage results, it being one of the principal objects of the invention to check the rise of the trolley before it reaches a sufficient angle with the horizontal to demolish the overhead wiring. The first cross wire is really used as a trip to set the mechanism in operation, the said mechanism serving to draw the trolley downward out of the danger zone immediately after the first cross wire is struck by the trolley and the trolley rebounds downward from its contact therewith. The cord can at all times in the descent of the reel be wound up upon the reel, but cannot unwind because of the co-action of the dogs 16 with the abutment 20. The guide 37 holds the dog in a projected position so as to contact with the abutment, and prevent further rotation of the reel to unwind the cord, although the reel is always perfectly free to rotate in a reverse direction to wind up the cord.

I do not desire to be understood as limiting myself to the specific construction, combination and relative arrangement of parts, members and features shown and described; but reserve the right to vary the same, in adapting the improvements to varying conditions of use, without departing from the spirit of the invention and the terms of the following claims.

Having thus described my invention, I claim and desire to secure by Letters Patent:—

1. A reel provided in one side thereof with an annular space, a substantially radial dog slidably mounted upon the reel, the inner end of the dog projecting into the before mentioned annular space where it is provided with a contracted portion terminating in a head, the said dog being adapted to be held in a projected position when the speed of the reel exceeds a certain limit, an abutment adapted to engage the dog when in a projected position to hold the reel against rotation, the said dog normally clearing the abutment, and a guide projecting into the annular space of the reel and adapted to engage the contracted portion of the dog to hold the dog in a projected position when it engages the abutment.

2. A reel, a way upon which the reel is slidably mounted, a stop upon the way, and a lock co-acting with the stop in projected position to hold the reel in position upon the way; the reel being provided with a dog slidable substantially radially of the reel, means co-acting with the dog in projected position to limit rotation of the reel, and trip-means between said last named means and said lock.

3. A reel, a way upon which the reel is slidably mounted, a stop upon the way, and a lock co-acting with the stop in projected position to hold the reel in position upon the way; the reel being provided with a dog slidable substantially radially of the reel, means co-acting with the dog in projected position to limit rotation of the reel, and trip-means between said last named means and said lock; there being a latch acting to hold said lock in retracted position and co-acting with said stop to release the lock for re-engagement with said stop.

4. A reel, a way upon which the reel is slidably mounted, a stop upon the way, and a lock co-acting with the stop in projected position to hold the reel in position upon the way; the reel being provided with a dog slidable substantially radially of the reel, means co-acting with the dog in projected position to limit rotation of the reel, and trip-means between said last named means and said lock; there being a latch acting to hold said lock in retracted position and co-acting with said stop to release the lock for re-engagement with said stop; tension means being provided for normally holding said lock in projected position.

5. A reel, a way upon which the reel is slidably mounted, a lock upon the reel for holding the reel normally in a predetermined position upon the way, a substantially radial dog slidably mounted upon the reel and adapted to normally drop by gravity as it passes through the upper portion of its cycle, an abutment adapted to be engaged by said dog when the rotation of the reel becomes sufficiently fast to prevent dropping of the dog by the action of gravity, and means actuated by engagement of the dog with the abutment for moving the before mentioned lock into an inoperative position.

6. A reel, a way upon which the reel is slidably mounted, a lock upon the reel for holding the reel in a predetermined position upon the way, a substantially radial dog slidably mounted upon the reel and adapted to drop by gravity as it passes through the upper portion of its cycle, a movable abutment adapted to be engaged by said dog when the rotation of the reel becomes sufficiently fast to prevent dropping of the dog by gravity, means actuated by the movement of the abutment caused by engagement of the dog therewith to move the lock into an inoperative position and release the reel upon the way, and a detent for retaining the lock in an inoperative position.

7. A reel, a dog slidable substantially radially of the reel, means co-acting with the dog when in projected position to limit rotation of the reel in one direction, means temporarily holding the dog in projected position, said first named means being provided with a trip, a way provided with a stop and upon which the reel is slidably mounted, a lock connected with the trip and co-acting with the stop, means acting to hold the lock normally in engagement with the stop, a latch acting to hold the lock out of engagement with the stop, said latch co-acting with said stop to release the lock, and tensional means acting upon the latch.

In testimony whereof, I have signed my name to this specification in the presence of two subscribing witnesses.

JAMES R. RICKETTS.

Witnesses:
W. F. SEEMANN,
H. M. FULMER.